United States Patent [19]

Visser

[11] 3,994,738

[45] Nov. 30, 1976

[54] COMPOSITION SUITABLE FOR USE IN THE PLUGGING OF THE TAPHOLES OF A METALLURGICAL FURNACE

[75] Inventor: Reier Visser, Driehuis, Netherlands

[73] Assignee: Koninklijke Nederlandsche Hoogovens en Staalfabriken N.V., Ijmuiden, Netherlands

[22] Filed: May 20, 1974

[21] Appl. No.: 471,556

Related U.S. Application Data

[62] Division of Ser. No. 245,594, April 19, 1972, abandoned.

[30] Foreign Application Priority Data

Apr. 20, 1971 Netherlands ....................... 7105306

[52] U.S. Cl. .................................... 106/55; 106/56; 106/58; 106/65; 106/67
[51] Int. Cl.² ......................................... C04B 35/02
[58] Field of Search ................... 106/56, 67, 65, 44, 106/58, 55

[56] References Cited
UNITED STATES PATENTS 3,775,140  11/1973  Visser et al. ......................... 106/56

Primary Examiner—J. Poer
Attorney, Agent, or Firm—Hall & Houghton

[57] ABSTRACT

A composition suitable for use in the plugging of tapholes of a metallurgical furnace is provided, which comprises a mixture of 60–80% refractory and erosion-corrosion resistant grain material, 12–18% binder substantially on the basis of tar products, and 4–12% bonding clay. Preferably: the binder contains 65–75% of electrode pitch, 9–11% of $C_2$-resins and has a viscosity less than 8000 cp. at 20° C; the refractory consists 20–40% of sieve fractions of approximately 3–6 mm, the balance being of finer grains; the composition also contains ground soft coal, approximately to 10%; the refractory is burned magnesite with over 80% MgO content, or a mixture of 56–100% of $Al_2O_3$ and from 0–44% $SiO_2$, or a mixture containing 50–100% SiO and from 0–50% $SiO_2$; and the refractory material contains impurities reducing its sintering point toward or below 1300° C.

10 Claims, 2 Drawing Figures

3,994,738

COMPOSITION SUITABLE FOR USE IN THE PLUGGING OF THE TAPHOLES OF A METALLURGICAL FURNACE

This is a division of application Ser. No. 245,594, filed Apr. 19, 1972 now abandoned.

The invention relates to a process for plugging tapholes of metallurgical furnaces, in particular of blast furnaces. In such a process it is known to fill the tap hole with clayish mass after tapping the blast furnace. The object of this is to shut the interior of the furnace off from the atmosphere, as a result of which a quantity of molten pig iron may form again within the wall of this furnace. This production of pig iron can take place at an overpressure of several atmospheres within the furnace, as a result of which the yield of the furnace is considerably increased.

Figure 1:
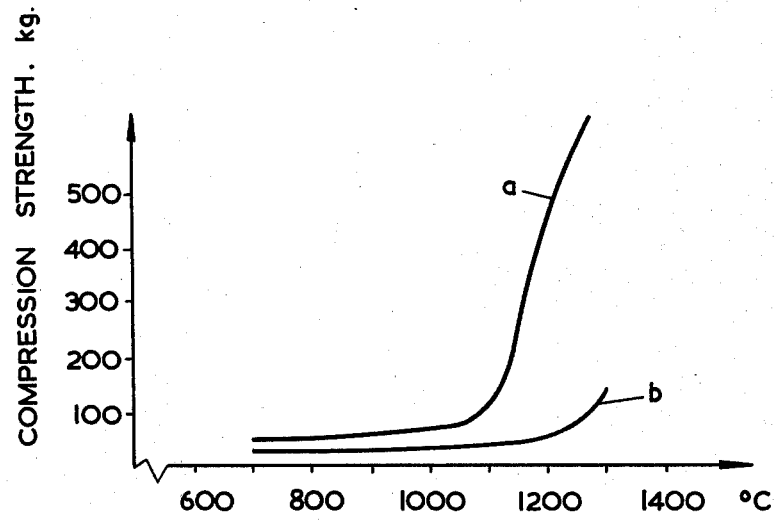

FIG. 1 of the drawing is a graph showing the compression strength against temperature of compositions with and without bonding clay.

Figure 2:
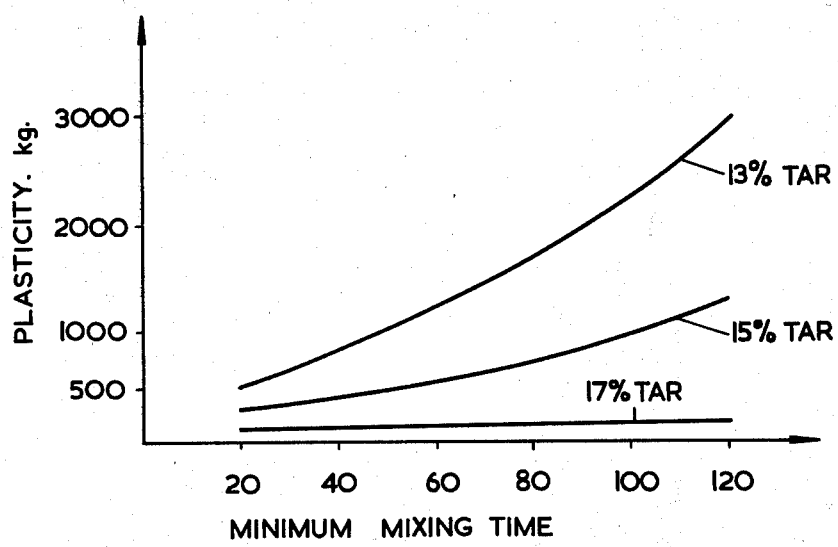

FIG. 2 of the drawing is a graph showing plasticity against time of compositions containing varying percentages of tar.

During the plugging, an amount of the plugging mass is brought into the tap hole by a so-called plugging apparatus; protecting the mass so long against overpressure in the furnace, until it sticks sufficiently on the wall of the tap hole and is sintered itself. At the next tapping a hole is drilled and burned through the plugging mass. A customary mass, which is applied as plugging mass, consists of approximately 70% so-called sticking sand and furthermore of approximately 10% fine soft coal and 20% tar products. Other combinations are also known. By sticking sand the silica containing material is understood, which is mostly found in nature with a water content of 7 to 9% and possesses sticking properties. An analysis of such a sticking sand consists for instance of 85% $SiO_2$ together with approximately 4–5% $Al_2O_3$; 1—1.5% $CaO$ and small quantities of $Na_2O$; $K_2O$ and Fe-compounds.

Several demands may be made upon a proper plugging mass. For instance, the mass will have to come quickly to a sufficient hardening and to a solid adhesion with the wall of the tap hole, so that the tap hole between two tappings is not blown through as a result of high pressure within the furnace.

Apart from the great dangers resulting therefrom for the attendants, such a situation also means a considerable loss of production, because in such a case the wind pressure of the furnace must be removed at once, as a result of which the production of pig iron will almost come to a standstill as well.

As a result of a quick hardening of the mass it is possible to remove the plugging apparatus sooner, which prolongs the available time, necessary for the execution of repairs at the pitch. Anyhow, it is desirable for the plugging mass to be sufficiently hardened through and through before the plugging apparatus is being removed, this hardening must have taken place in any case when a new tap hole is being drilled in it, otherwise the unhardened mass would be flushed away by the flow of iron.

Furthermore the hardened plugging mass should not be eroded and/or corroded too fast by the flow of iron of slag during tapping. As a result of a too fast erosion or corrosion of the plugging mass the furnace will run too irregularly during tapping, which has a detrimental influence on the production capacity. Untimely wear of the tap hole can even result in a breaking of the hole wall or a washing away of coke, in which case the flow of iron cannot be regulated anymore.

On the other hand the erosion and corrosion of the tap hole may not be too small. As the iron level within the furnace falls during tapping, the static pressure will decrease. In order to keep the flow of iron at a more or less constant output, it is necessary for the flow resistance of the tap hole to decrease gradually according as this static pressure diminishes. A certain, regulated erosion of the tap hole, especially at its entry is therefore desirable.

Furthermore it is observed that a too powerful flow of iron may also lead to an undesirable wear of other parts, which guide the flow of iron, such as the pitch, the run and the skimmer.

It appeared, that with modern large blast furnaces with great production capacities and high peak pressures the plugging masses used so far may cause difficulties. It is particularly evident, that the stronger wear of the tap hole, the pitch and the run, during tapping, may cause these difficulties in no small measure as a result of the bigger masses of pig iron to be tapped per unit of time. Moreover the higher working pressures within the furnace, occurring more and more nowadays, add to the difficulty of letting the plugging mass form a sufficiently solid closing.

Another objection to the — as well-known accepted above — strong-watercontaining plugging mass consists in that this mass at temperatures near or below freezing point becomes too thick, as a result of which it is difficult to plug it.

The main objection to plugging masses with a considerable water content is, however the danger of the presence of water in the neighbourhood of a carbon lining in the furnace. Such carbon linings are more and more applied nowadays.

According to the invention a mass was found, which leads to extremely good results when using it as a plugging mass. The objections of the known masses, mentioned above, are now met for the greater part.

This invention relates to the fact, that a mixture is used as plugging mass, consisting of 60% to 80% of a high quality refractory and erosion- and corrosion resistant grain material, for 12% to 18% of binder mainly on the base of tar, and for 4% to 12% of bonding clay. By bonding clay is understood in this respect the material described in the book "Feuerfestkunde" edition 1960, page 351 by Harders-Kienov. This material has a sheet structure and contains some water. A well-known bonding clay is for instance bentonite.

The new plugging mass has in combination several benefits in respect of other well-known plugging masses. It seems for instance that after plugging it reaches quickly a strong cohesion, which is partly reached owing to the originating of a carbon skeleton between the grains refractory material, as a result of the decomposition of the tar, and which originates further from a direct mutual sintering of these grains.

The new mass quickly becomes so hard and fireproof, that at the next tapping the material of the taphole will not be washed away by the flow of iron. As furthermore the binder, but also the fire-proof mass, are free of water, while the bonding clay brings only a relatively small amount of water into the mass, a well kneadable mass is obtained even at temperatures near or below freezing point. Combined with tar, a sticking sand or another watercontaining mass might lead to difficulties when mixing, owing to the fact, that tar cannot be moistened by water. It is surprising, however, that the mixing of the bonding clay with the tar does not cause any trouble.

It is the function of the binder — apart from making the mass a sticking and ready-to-press one — to act as binding agent in the mass before the refractory component sinters. This binding agent consists of a carbon skeleton, formed by way of the carbonizing of the heaviest tar fractions in the binder. Moreover the binder must also contain enough lighter tar fractions, so that the plugging mass will remain sufficiently kneadable. It is observed, that the carbon skeleton, which is being formed from the tar products, has also the function to decrease the contact between the discharging iron and the discharging slag with the material of the tap hole. It is a well-known fact, that carbon does not permit itself to be moistened by liquid iron and liquid slag.

The bonding clay in the mass performs several functions. An important function is for instance to take care that the tar products remain properly mixed in the mass. As a rule the mass stays namely in the plug gun for a considerable time before the plugging takes place. Then the temperature of the mass in the plug gun may rise and show considerable differences. So it happened in a certain case, that shortly before plugging temperatures of 58° and 95° C were found in the mass. Without bonding clay being present in the mass the tar separates and flows out of the plug gun.

Another function of the bonding clay is to reach a quicker sintering of the plugging mass in the plug hole. For a representative mass according to the invention the process of the compression strength of this mass is shown in FIG. 1 as a function of the heating temperature (curve $a$).

At these temperatures the mass was heated in each case during 2 hours, after which the compression strength was measured. As a counter test a mass was examined of identical composition, but without bonding clay. The results of this test are also shown in the same figure (curve $b$); it is quite obvious that at low temperatures the plugging mass acquires a greater compression strength, owing to the addition of bonding clay. Although during this test this result was reached with 10% bonding clay, similar improvements are reached by adding other quantities of bonding clay and by choosing other fire-proof components and other binders, as far as this choice falls within the scope of the invention. It is observed that the compression strength with these tests was determined in accordance with the method described in the German standard paper D.I.N. 51067.

An important quantity of measurement of the plugging mass is the so-called workability coefficient. This is a measure for the capacity of the mass to transfer a shear force, after a certain shearing deformation has taken place. Among other things this quantity of measurement is also determining for the holding power of the plugging mass on the wall of the tap hole. It is determined as follows: A mass, of which the workability coefficient is being determined, is brought into a sample container by means of a spatula. Attention should be paid, that no empty spaces will remain. The sample container is filled exactly to the rim.

The sample container is a metal cylinder with a height of 5 cm and an inner diameter of 10.7 cm. In this cylinder a prop with a thickness of 1.7 cm and a diameter of 8.8 cm fits. This stamp is centered within the sample container by means of a thin steel ring. The sample container together with the stamp are placed in a pressure bench. Now the prop is thus far pressed, that its upper edge is pressed exactly to the rim of the sample container in the mass, after which the upwardly pressed material is removed.

Next the prop is pressed in the mass at such a speed, that the back pressure increases with appr. 20 kg/cm² a second. The temperature is kept on a constant level of appr. 24° C, as accurately as possible. During the rise of the pressure the displacement of the prop is measured. When this displacement amounts to 1 cm the compression strength is read in kgs. This compression strength is then the desired workability coefficient.

It has become evident that the mass becomes too slack to harden quickly with a workability coefficient of less than 100 kg. If, however, this coefficient is more than 500 kg., then the material is not properly workable, which can occur after it has been stored in a cold atmosphere.

Dependent on the presence of the bonding clay the plugging mass mixture keeps the initial workability coefficient during a considerable period. With a plugging mass according to the invention, containing 10% bonding clay, this mass was mixed until a workability coefficient of 500 kg was reached. After a standstill of 4 hours this coefficient had risen to a value of only 510 kg. Even after a standstill of 50 hours a workability coefficient of only 585 kg was reached, which still made this mass very suitable for use.

It will be quite clear to the experts, that a similar constant quality of plugging masses on a tar base is very unusual and surprising.

According to the invention satisfactory results are achieved if the plugging mass contains 12 to 18% binder, which consists of 65 to 75% of electrode pitch, and 9–11% of a $C_2$-resins and has a viscosity of less than 8000 cp at 20° C.

The determination of the pitch elements is executed at 67° C according to the determination method of Kramer and Sernow. By $C_2$-resins the tar products are understood, which dissolve in pyridine, but not in toluene.

A clear advantage of the new process is that the plugging apparatus must remain before the tap hole for a much shorter period. Apart from the fact that the new plugging mass hardens more quickly as a result of the better conduction of heat, this is mainly due to the better holding power on the old wall of the tap hole. This better holding power is related to the higher workability coefficient of the material used with respect to the previously employed plugging masses.

The best values for the thus determined workability coefficient and also the best results of the plugging mass in the practice of plugging, are achieved if — according to the invention the fire-proof component consists for 20% to 40% of sieve fractions of appr. 3 and 6 mm and for the rest of finer grains.

The content of coarser sieve fractions is to a certain extent also determined by the nature of the impurities in the fireproof component. These impurities influence the resistance of the plugging mass against erosion and corrosion as a result of the flow of liquid slag. However, this resistance may also be influenced by the choice of the coarseness of the grain material. It has become evident that it is possible — by varying the percentage of sieve fractions of appr. 3 and 6 mm — to compensate almost completely the influence of the impurities on the resistance of the mass against erosion and corrosion by iron or slag.

If the mass contains too many and too pure fire-proof components, there is a possibility of the sintered plugging mass becoming so resistant, that the opening, which is burned at the end of the tap hole, becomes small and remains too small, as a result of which the iron flows out in a too limited current. Once the iron flows it is not possible anymore to widen the inlet opening of the tap hole from the outside. It has become clear, that the plugging mass can be made more suitable for perforation if it also contains ground soft coal. Therefore it is possible to let the wear of the tap hole pass off in a controllable way, adapted to the elapsed period of tapping. The best results are achieved when appr. 10% coal is added, preferably when this coal does not contain coarser fractions than the grains of fireproof component.

In order to obtain a proper smooth mass it is recommendable to mix first the coal with this fire-proof component, after which the binder is added.

The fine soft coal used is of the so-called "baking" and swelling type. It improves the elastic properties of the mass and accelerates the binding of it by contributing to the forming of a carbon skeleton.

According to the invention satisfactory results are achieved if the fire-proof component of the plugging mass consists of burned magnesite with a MgO-content of more than 80%.

In order to accelerate the harding of the plugging mass still further and also to strengthen the direct ceramic binding between the magnesite grains it is desirable to stimulate the sintering of this magnesite. According to the invention this can be achieved because the magnesite contains well-known impurities with a sintering point reducing action in such a quantity that the sintering point is reduced as far as below appr. 1300° C.

It is known that there are several substances in magnesite as impurities, which reduce the sintering point of it. CaO; $SiO_2$; $Fe_2O_3$ etc. may be stated as such.

By adding $Cr_2O_3$ to the magnesite the quality of the plugging mass can also be improved, because consequently the constancy of the volume of the magnesite can be stimulated in an in itself well-known way.

According to the invention satisfactory results can also be obtained with a fire-proof component, consisting of a mixture of $Al_2O_3$ and $SiO_2$, whereby the element $Al_2O_3$ may vary from 56% to 100%. Bauxite can also be used with a pure $Al_2O_3$ content of 60 to 90%.

It is observed that bauxite when heated possesses a tendency towards a growth of crystal, as a result of which the mass as a whole obtains a growing action. This may be desirable under certain circumstances, because consequently the tap hole is better locked against the overpressure within the furnace.

Finally satisfactory results can also be obtained with a fire-proof component of mainly burned dolomite, or a component consisting of a mixture of SiC and $SiO_2$, in which the SiC content may vary from 50% to 100%. In case of special applications mixtures of the above mentioned fire-proof materials may also be used as fireproof component.

It is remarkable that with a combination of MgO or $Al_2O_3$ with bonding clay satisfactory results can be obtained. In metallurgical circumstances MgO and $Al_2O_3$ must be considered as "basic" and bonding clay as "acid".

It is true that the fire-proof properties of these plugging masses deteriorate a little by mixing bonding clay, but it has become evident that these fire-proof properties are still amply sufficient for this application.

In preparing the plugging mass, the mixing time, during which the components are mixed, appeared to be very important owing to the influence on the plasticity of the mixture.

It is to be supposed in general, that with this process of mixing two effects occur, which act in a different way.

During the first period of mixing the plasticity will decrease as a result of the improvement of the mixture of the components. After some time has elapsed the effect of a reaction of polymerisation, accelerated by the action of mixing will, however, show itself in the tar by an ever increasing plasticity.

As a result of the presence of the bonding clay the first mentioned effect on the plasticity is strongly reduced and the effect of the reaction of polymerisation will dominate.

FIG. 2 shows the relation between the plasticity, the content of tar and the mixing time for a mixture of the following composition:

10% clay

10% fine soft coal varying 13% – 17% pitch tar of the described type rest MgO.

Hence it is clear that the plasticity increases with the mixing time and decreases with the content of tar. According to the invention a proper homogenous mixture of the components can be obtained by mixing these components for at least 60 minutes and preferably during appr. 120 minutes.

The figure shows that within a broad range of tar contents a great choice of plasticity values can be obtained. The different lines in a figure also proceed sufficiently flat to be able to realize in accurately reproduceable way the desired plasticity by way of variation of the mixing time.

Apart from the above mentioned process for the plugging of tap holes, the invention also relates to a mass of the described type.

What we claim is:

1. A composition suitable for use in the plugging of tapholes of metallurgical furnaces comprising 60 to 80% of a high quality refractory and erosion and corrosion resistant grain material selected from the group consisting of burned magnesite having a MgO content greater than 80%, $Al_2O_3$, a mixture of $Al_2O_3$ and $SiO_2$ in which the $Al_2O_3$ content is at least 56%, burned dolomite stone, SiC, and a mixture of SiC and $SiO_2$ in which the SiC content is at least 50%; 12 to 18% of a binder material derived from tar; and 4 to 12% bonding clay, said composition possessing quick sintering properties and possessing a rate of wear when in use such as to insure that the flow of iron through the taphole will be at a substantially constant rate during the tapping of the furnace notwithstanding the decrease of the static head in the furnace during such tapping.

2. A composition in accordance with claim 1, wherein said binder material comprises 65 to 75% of electrode pitch and 9 to 11% of $C_2$-resins, with the viscosity thereof being less than 8000 cp. at 20° C.

3. A composition in accordance with claim 1, wherein the refractory material consists of 20 to 40% of sieve fractions of approximately 3 and 6 mm, with the balance thereof being of a finer grain size.

4. A composition in accordance with claim 1, wherein the plugging material further includes a minor amount of ground soft coal.

5. A composition in accordance with claim 4, wherein the content of the soft coal is about 10%.

6. A composition in accordance with claim 1, wherein the refractory material consists of burned magnesite having a MgO-content of more than 80%.

7. A composition in accordance with claim 1, wherein the refractory material consists of a mixture of $Al_2O_3$ and $SiO_2$, in which the $Al_2O_3$ content is at least 56%.

8. A composition in accordance with claim 1, wherein the refractory material consists of burned dolomite stone.

9. A composition in accordance with claim 1, wherein the refractory material consists of a mixture of SiC and $SiO_2$, in which the SiC content is at least 50%.

10. A composition in accordance with claim 1, wherein the refractory material further contains minor amounts of impurities selected from the group consisting of CaO, $SiO_2$, $Fe_2O_3$, and mixtures thereof, said impurities lowering the sintering point of said material down to as low as 1300° C.

* * * * *